(12) United States Patent
Miyamoto et al.

(10) Patent No.: US 8,893,123 B2
(45) Date of Patent: Nov. 18, 2014

(54) METHOD AND SYSTEM FOR TRANSFERRING THE OPERATION OF A VIRTUAL MACHINE FROM A SERVER DEVICE TO TERMINAL DEVICE USING OPERATING STATUS OF THE VIRTUAL MACHINE

(75) Inventors: Ryo Miyamoto, Kawasaki (JP); Takashi Ohno, Kawasaki (JP); Koichi Yamasaki, Kawasaki (JP); Kazuki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 534 days.

(21) Appl. No.: 12/973,117

(22) Filed: Dec. 20, 2010

(65) Prior Publication Data

US 2011/0154333 A1    Jun. 23, 2011

(30) Foreign Application Priority Data

Dec. 23, 2009  (JP) ................................ 2009-291582

(51) Int. Cl.
  *G06F 9/455*   (2006.01)
  *G06F 11/30*   (2006.01)

(52) U.S. Cl.
  CPC .......... *G06F 9/45533* (2013.01); *G06F 11/301* (2013.01); *G06F 11/3055* (2013.01); *G06F 11/3089* (2013.01)
  USPC ............................................................ 718/1

(58) Field of Classification Search
  CPC .............. G06F 11/301; G06F 11/3055; G06F 11/3089; G06F 9/45533
  See application file for complete search history.

(56) References Cited

U.S. PATENT DOCUMENTS

| | | | |
|---|---|---|---|
| 8,135,818 B2* | 3/2012 | Heim ............................ | 709/223 |
| 8,281,018 B2* | 10/2012 | Heim et al. ................... | 709/227 |
| 2007/0180436 A1* | 8/2007 | Travostino et al. ........... | 717/138 |
| 2009/0007106 A1* | 1/2009 | Araujo et al. ..................... | 718/1 |
| 2009/0249332 A1* | 10/2009 | Hoehle et al. .................... | 718/1 |
| 2011/0016468 A1* | 1/2011 | Singh ............................... | 718/1 |

FOREIGN PATENT DOCUMENTS

| | | |
|---|---|---|
| JP | 2005-293417 A | 10/2005 |
| JP | 2006-72591 A | 3/2006 |

OTHER PUBLICATIONS

Japanese Office Action mailed Nov. 12, 2013 for corresponding Japanese Application No. 2009-291582, with Partial English-language Translation.

* cited by examiner

*Primary Examiner* — Meng An
*Assistant Examiner* — James J Lee
(74) *Attorney, Agent, or Firm* — Fujitsu Patent Center

(57) ABSTRACT

An information processing apparatus includes: a first virtual machine part to operate by being allocated to another information processing apparatus; a monitoring-application information storing part to store an application for monitoring the operation of the virtual machine part; a determining part to determine, in the virtual machine part, whether the application stored in the monitoring-application information storing part is operating by accessing an auxiliary storage device connected to the other information processing apparatus; a status storing part to store application information related to an operating status of the application when the determining part determines that the application is operating; an application exiting part to exit the application when the application information is stored; and a transmitting part to transmit virtual-machine information related to an operating status of the virtual machine part, together with the stored application information, to the other information processing apparatus when the application is exited.

4 Claims, 16 Drawing Sheets

METHOD AND SYSTEM FOR TRANSFERRING THE OPERATION OF A VIRTUAL MACHINE FROM A SERVER DEVICE TO TERMINAL DEVICE USING OPERATING STATUS OF THE VIRTUAL MACHINE

CROSS-REFERENCE TO RELATED APPLICATIONS

This application is based upon and claims the benefit of priority of the prior Japanese Patent Application No. 2009-291582, filed on Dec. 23, 2009, the entire contents of which are incorporated herein by reference.

FIELD

The embodiments relates to a machine system, an information processing apparatus, a method of operating virtual machines, and a program.

BACKGROUND

There is a system that runs a plurality of virtual machines (VM) on a server and allocates these virtual machines to terminals, which are connected to the server via a network. In this system, an operating system (OS) runs on each VM running on the server, and the user of each terminal uses the OS running on the VM allocated to the terminal. In other words, the server is used as a desktop computer of each terminal.

Japanese Laid-open Patent Publication No. 2006-072591 discusses a method of controlling a virtual machine when a failure occurs in the virtual machine by pausing the running virtual machine experiencing the failure, transferring the state of the paused virtual machine to another computer, and reconstructing the transferred state of the virtual machine in the other computer.

SUMMARY

According to an aspect of the invention, an information processing apparatus includes: a first virtual machine part to operate by being allocated to another information processing apparatus; a monitoring-application information storing part to store an application to monitor the operation of the virtual machine part; a determining part to determine, in the virtual machine part, whether the application stored in the monitoring-application information storing part is operating by accessing an auxiliary storage device connected to the other information processing apparatus; a status storing part to store application information related to an operating status of the application when the determining part determines that the application is operating; an application exiting part to exit the application when the application information is stored; and a transmitting part to transmit virtual-machine information related to an operating status of the virtual machine part, together with the stored application information, to the other information processing apparatus when the application is exited.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
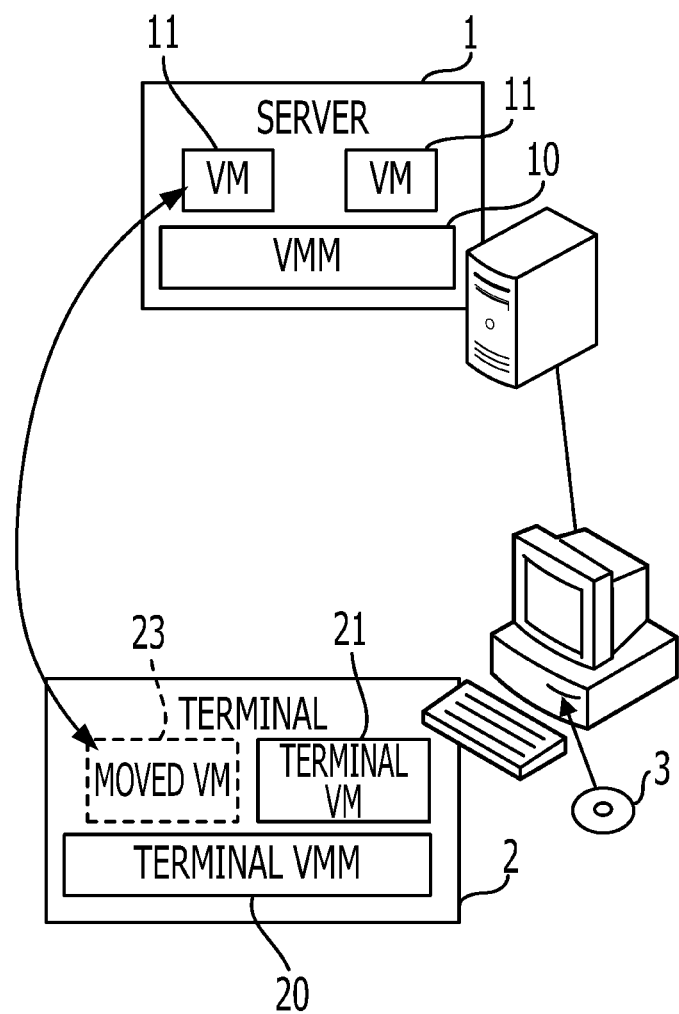
FIG. 1 is a schematic view of a computer system according to an embodiment.

A user can play a digital versatile disc (DVD) using a DVD drive installed in or connected to a terminal that runs by using a virtual machine. In such a case, the virtual machine accesses the DVD drive of the terminal via a network using, for example, a remote desktop protocol (RDP). The virtual machine receives and reproduces the data read by the accessed DVD drive and displays the data on a monitor of the terminal.

In this way, when an image is reproduced via a network, the processing load incurred on the virtual machine or the load on the network becomes great because a large amount of information is transmitted between the virtual machine and the terminal. Consequently, the quality of the image displayed on the monitor of the terminal is reduced.

To prevent the image quality from being reduced, the virtual machine running on the server may be moved to a terminal when images are reproduced using the virtual machine. By moving the virtual machine in this way, the processing performed by the virtual machine in the server can be performed at a terminal. In such a case, a high quality image is reproduced because the image is reproduced without being transmitted through the network.

For example, a running virtual machine may be paused, and the status of the paused virtual machine status may be transferred to a terminal to reconstruct the status of the transferred virtual machine in the terminal.

However, there is a problem with reproducing an image recorded on the DVD after moving the virtual machine from the server to the terminal because the user will have to wait until the moving of the virtual machine is completed.

There is a method of reproducing an image even while the virtual machine is being moved from the server to the terminal. That is, an image reproduction application run on the virtual machine employs the above-described RDP as a mechanism to use a device connected to the terminal. The RDP is a mechanism that allows communication between an RDP server running on the server and an RDP client running on the terminal. With this mechanism, the application accesses the device connected to the terminal from the server via a network. When the image production application uses the RDP to access the device connected to the terminal, the RDP client continues to control the device. Therefore, after the virtual machine is moved to the terminal, the devices connected to the terminal cannot be directly allocated to the virtual machine.

This embodiment enables image reproduction by an application running on a virtual machine while the virtual machine is being moved.

The computer system according to this embodiment includes a terminal and a server. The terminal is connected to an external device that reproduces stream data, such as an image, recorded on a recording medium. The server operates as a plurality of virtual machines. One of the virtual machines is allocated to the terminal. The virtual machine allocated to the terminal carries out data communication between the terminal and the server. The server includes an application monitoring part, a status storing part, an application exit part, and a VM moving part. The application monitoring part determines whether an application accessing the external device is running on the virtual machine allocated to the terminal. The status storing part stores application information related to the operating status of the application when the application monitoring part determines that the application is running. The application exit part exits the application after the application information is stored. When the application is exited, the VM moving part transmits virtual machine information related to the operating status of the virtual machine, together with the stored application information, to the terminal. The terminal includes a moved VM part, a device allocating part, and an application start-up part. The moved VM part runs the virtual machine on the basis of the virtual machine information sent from the server. The device allocating part allocates the external device to the running virtual machine. The application start-up part starts an application on the running virtual machine on the basis of the application information sent from the server.

The computer system according to this embodiment runs a virtual machine and an application on a terminal by moving a virtual machine running on a server to the terminal to which the virtual machine is allocated. For example, when the application handles large amounts of data, the network load can be reduced since the network is not used. As a result, in contrast to when the application processing speed of a virtual machine running on the server is reduced due to a network load, when an application is executed by a virtual machine running on the terminal, the application processing speed is unaffected by the network load. With the computer system according to this embodiment, an application continues to run even while a virtual machine is being moved. Therefore, a user can reproduce an image using an application without waiting for the moving of the virtual machine to be completed.

This embodiment will be described in detail with reference to the accompanying drawings.

FIG. 1 is a schematic view of a computer system according to this embodiment.

The computer system according to this embodiment includes a server (information processing apparatus) 1 and a terminal (information processing apparatus) 2. The server 1 and the terminal 2 are connected via a network, such as a local area network (LAN) or a wide area network (WAN). The computer system illustrated in FIG. 1 includes only one terminal 2. However, the number of terminals connected to the server 1 may be changed appropriately. The connecting mode of the server 1 and the terminal 2 may be selected appropriately between a wired connection and a wireless connection.

The server 1 runs a virtual machine monitor (VMM) 10, which is a virtualization program, and a plurality of virtual machines (VMs) 11 (two illustrated in the drawing) run on the VMM 10. The VMM 10 allocates the resources of the server 1, such as a central processing unit (CPU) and a read only memory (ROM), to enable the VMs 11 to use the resources. Each of the VMs 11 is a virtual computer that independently runs an OS and applications, in substantially the same manner as a physical computer. A terminal 2 connected to the server 1 is allocated to each of the VMs 11. The VM 11 is operated from the allocated terminal 2 via a network. The server 1 may be a personal computer equipped with a keyboard, a monitor, and so on.

The terminal 2 is a computer equipped with a monitor, an input/output device including a keyboard and mouse, and a removable disc device (hereinafter referred to as "disc device") to which a portable recording medium, such as a DVD 3, is inserted for use. The terminal 2 performs data communication with the server 1 via a network. A VM 11 running on the server 1 is allocated to the terminal 2. The terminal 2 operates the allocated VM 11 via the network. For example, the terminal 2 transmits an instruction input by operating the keyboard and mouse to the allocated VM 11, receives the processing result from the VM 11, and displays the processing result on the monitor.

For example, the terminal 2 runs a VMM 20, in a manner similar to the server 1, a VM 21 runs on the VMM 20. Hereinafter, the VMM and VM of the terminal 2 are respectively referred to as "terminal VMM 20" and "terminal VM 21." The VMM 20 allocates the resources and physical devices (external devices) of the terminal 2 to the terminal VM 21 so that the terminal VM 21 can use the resources and physical devices. The physical devices of the terminal 2 include an input/output device and a disc device. The terminal VM 21 is a virtual computer that independently runs an OS and applications in substantially the same manner as a physical computer. A VM 11 running on the server 1 is allocated to the terminal VM 21. The allocated VM 11 is operated by the terminal VM 21 of the terminal 2 via the network.

The terminal 2 may be a set top box (STB) connected to a monitor, a personal digital assistant (PDA), or a mobile phone. The terminal 2 according to this embodiment includes the input/output device and the disc device. The input/output device and the disc device may be detachable.

In the computer system according to this embodiment, the VM 11 running on the server 1 is moved to the terminal 2 when a specific application is executed by the VM 11 and runs on the terminal VMM 20 of the terminal 2. The VM that is moved from the server 1 and runs on the terminal VMM 20 of the terminal 2, as described above, is referred to as "moved VM 23."

Figure 2A:
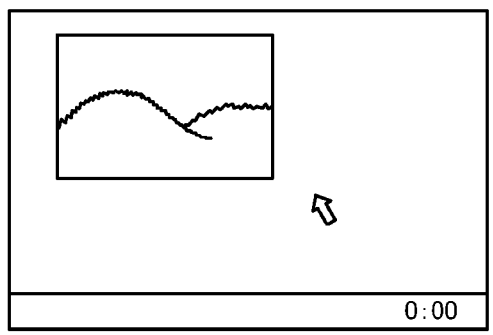
FIG. 2A is a schematic view illustrating the moving timing of a virtual machine (VM) of a server.
Figure 2B:
FIG. 2B is a schematic view illustrating the moving timing of a VM of a server.
Figure 2C:
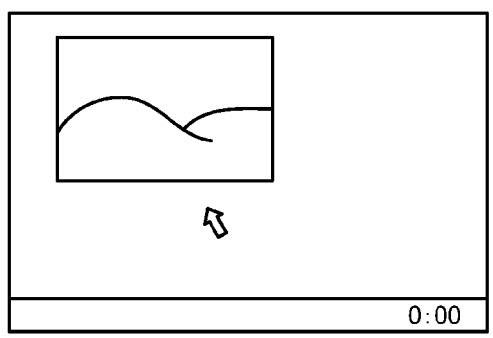
FIG. 2C is a schematic view illustrating the moving timing of a VM of a server.

FIGS. 2A-2C are schematic diagrams illustrating the timing of moving the VM 11 of the server 1. FIGS. 2A-2C illustrate a screen that is displayed on the monitor of the terminal 2. FIGS. 2A, 2B, and 2C illustrate the screen in sequence.

For example, when the DVD 3 is inserted to the disc device of the terminal 2, the content (hereinafter referred to as "image") recorded on the DVD 3 is transmitted to the VM 11 of the server 1. The VM 11 runs an application (hereinafter referred to as "image application") for reproducing the image, and the image application reproduces the image sent from the terminal 2. The reproduced image is transmitted to the terminal VM 21 of the terminal 2 and is displayed on the monitor of the terminal 2 (see FIG. 2A). In this case, since the image displayed on the monitor of the terminal 2 is transmitted between the terminal 2 and the server 1 via the network, the image may be distorted due to a high network load.

Next, the image application running on the VM 11 is temporarily exited (see FIG. 2B), and the VM 11 running on the server 1 is moved to the terminal 2. After being moved, the devices are switched between the terminal VM 21 and the moved VM 23. Then, the image application is restored on the moved VM 23 running on the terminal 2 such that the image continues to be reproduced by the image application and displayed on the monitor of the terminal 2 (see FIG. 2C). In such a case, since the image is displayed on the monitor without being transmitted through a network and since the input/output device and disc device connected to the terminal 2 are directly controlled, a high quality image can be displayed on the monitor. After the image is displayed and the image application is exited, the moved VM 23 is moved from the terminal 2 to the server 1.

In this way, when an image recorded on the DVD 3 is reproduced in the computer system according to this embodiment, the VM 11 is moved from the server 1 to the terminal 2, and the image is reproduced on the moved VM 23 by directly controlling the input/output device and disc device connected to the terminal 2. In this way, distortion of the image is reduced. Since the VM 11 is not moved at the beginning of image reproduction, and the image is reproduced by starting the image application on the VM 11 of the server 1, the time required for displaying the images on the monitor of the terminal 2 is shortened, compared with when image reproduction is started after the VM 11 is moved to the terminal 2.

Figure 3:
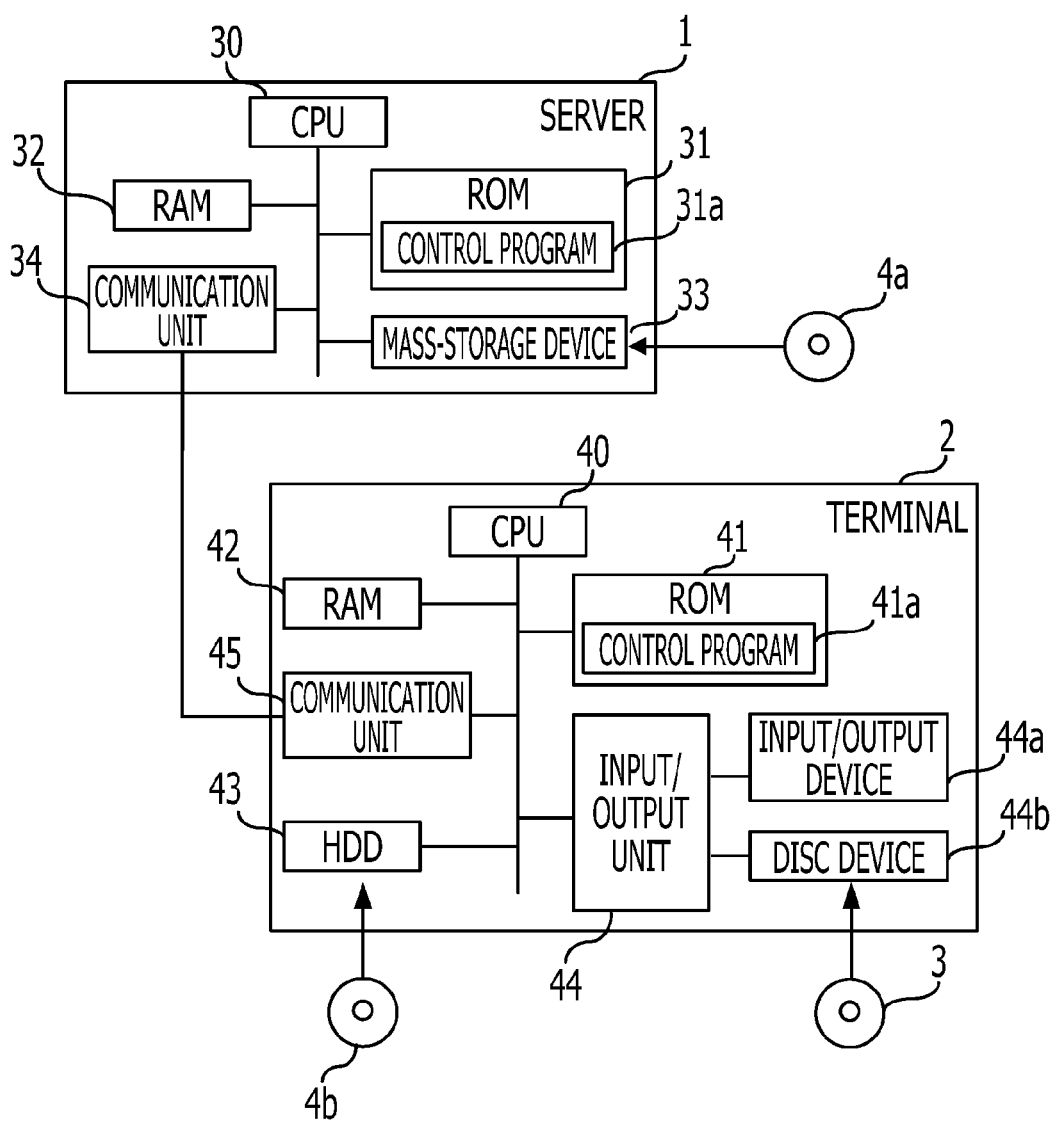
FIG. 3 is a block diagram illustrating the hardware configuration of the computer system.

FIG. 3 is a block diagram illustrating the hardware configuration of the computer system.

The server 1 includes hardware units, such as a CPU 30, a ROM 31, a random access memory (RAM) 32, a mass-storage device 33, and a communication unit 34 for connecting to the network. The hardware units are connected to each other via a bus.

The CPU 30 reads a control program stored in advance in the ROM 31 or the mass-storage device 33 to the RAM 32 when required to run the control program and controls the operation of the above-mentioned hardware units. A control program 31a for operating a server such as the server 1 according to the present invention is stored in advance in the ROM 31. The control program 31a may be installed to the mass-storage device 33 using an external medium, such as a CD-ROM 4a, or may be downloaded through the network.

The RAM 32 is, for example, a static RAM (SRAM), a dynamic RAM (DRAM), or a flash memory. Various data items that are generated when a control program is executed by the CPU 30 are stored in the RAM 32. The mass-storage device 33 is, for example, a hard disc drive (HDD). A virtual machines monitor (VMM) program, a management OS program, a guest OS program, an application program, and various data items are stored in the mass-storage device 33. Each program is a control program read and executed by the CPU 30 and is read to the RAM 32 and executed by the CPU 30. The programs may be stored in the ROM 31.

The VMM program is a virtualization software program used for running the VM 11 on the server 1. The VMM program starts operating as the VMM 10 when the CPU 30 executes the VMM program after the server 1 is started. When the CPU 30 runs the VMM program as the VMM 10, a virtual environment in which a plurality of VMs 11 independently operated is established in the server 1.

The management OS program is a software program that starts and terminates the VMs 11 on the VMM 10, allocates resources, such as the CPU 30, to the VMs 11, and requests allocation of the resources to the VMM 10. The management OS program starts operating as a management OS when the CPU 30 executes the management OS program after the server 1 is started.

The guest OS program is a software program that runs an OS on a VM 11. The guest OS program starts operating as an OS (hereinafter referred to as "guest OS") when the CPU 30 executes the guest OS program after the VM 11 is started. The guest OS is, for example, Windows® or Linux®. The guest OS generates a display screen including a character user interface (CUI), a graphic user interface (GUI), and so on corresponding to the processing, and the generated display screen is sent to the terminal 2 for display on the monitor of the terminal 2. The guest OS receives control signals from the keyboard and mouse of the terminal 2. The guest OS functions as an executing part that performs various types of processing corresponding to the received control signal.

The application program is a software program of an application (for example, image application) that is run on a guest OS. The server 1 may read an application program from an external memory on which the application program is recorded and store the application program in the mass-storage device 33. Instead, the server 1 may download the application program through the network and store it in the mass-storage device 33.

The terminal 2 includes hardware units, such as a CPU 40, a ROM 41, a RAM 42, a HDD 43, an input/output unit 44, and a communication unit 45 for connecting to the network. The hardware units are connected to each other via a bus.

The CPU 40 reads and executes control programs stored in advance in the ROM 41 or the HDD 43 to the RAM 42 when required and controls the operation of the above-mentioned hardware units. A control program 41a required for operating a terminal as the terminal 2 according to the present invention is stored in advance in the ROM 41. The control program 41a may be installed to the HDD 43 using an external medium, such as a CD-ROM 4b, or may be downloaded through the network.

The RAM 42 is, for example, an SRAM, a DRAM, or a flash memory and temporarily holds various data items generated when a control program is executed by the CPU 40. Similar to the server 1, a VMM program, a management OS program, a guest OS program, an application program, and various data items are stored in the HDD 43.

The input/output unit 44 is connected to an input/output device 44a, including a keyboard, a mouse, and a monitor, and a disc device 44b. The input/output unit 44 has a universal serial bus (USB) port and a monitor connection port. The input/output unit 44 transmits and receives data to and from the input/output device 44a and the disc device 44b, which are connected via a USB cable and a monitor connection cable. The DVD 3 can be inserted to or ejected from the disc device 44b. When the DVD 3 is inserted to the disc device 44b, the input/output unit 44 notifies the CPU 40.

The functions realized by the server 1 and the terminal 2 of the computer system will be described below.

Figure 4:
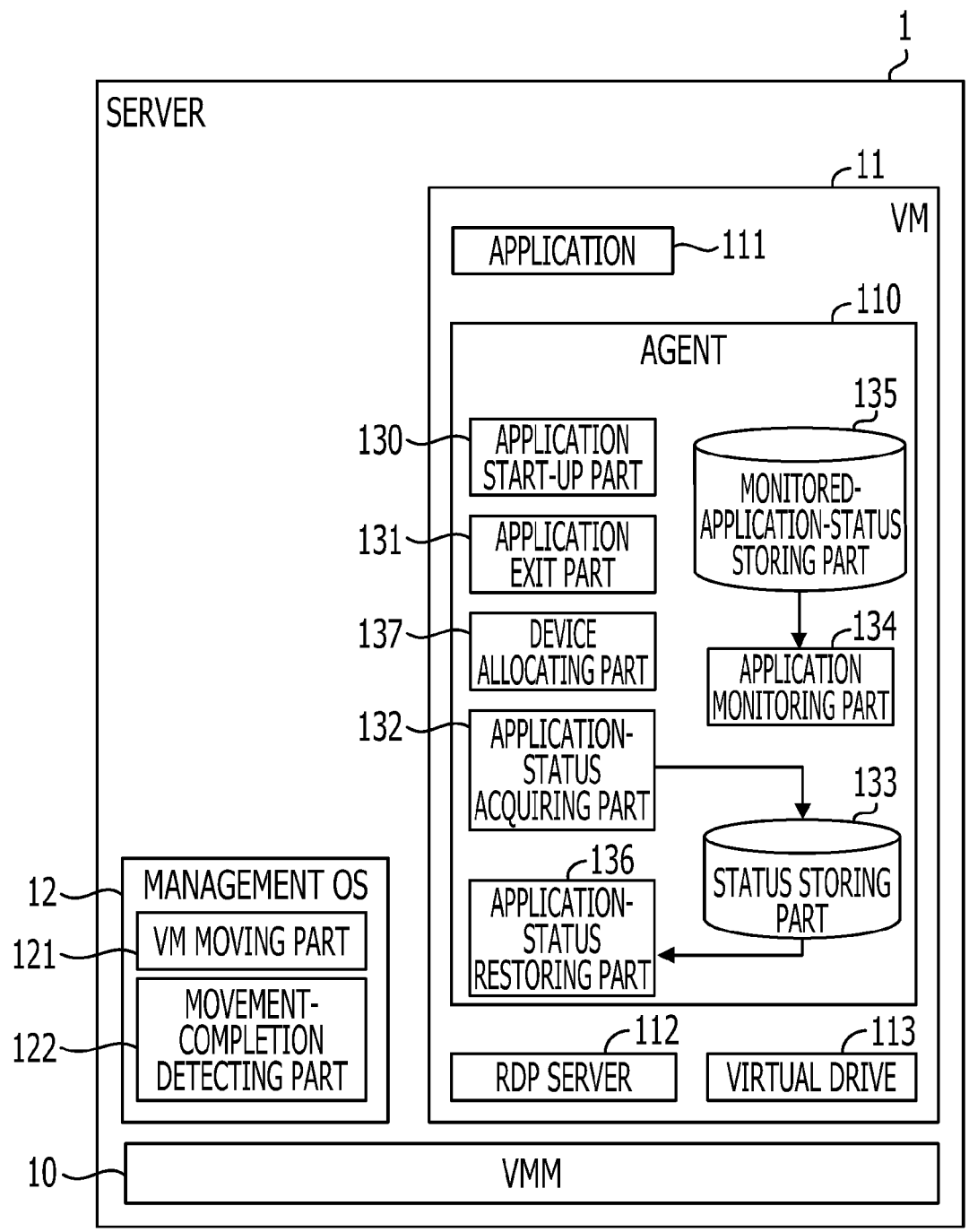
FIG. 4 is a block diagram illustrating the functions of the server.

FIG. 4 is a block diagram illustrating the functions of the server 1.

When the CPU 30 executes the programs, the VMM 10 runs on the server 1, and the VM 11 and a management OS 12 run on the VMM 10. The management OS 12 allocates the resources (such as the CPU 30 and the ROM 31) of the server 1 to the VM 11 started by the VMM 10. After the resources are allocated, the guest OS starts running on the VM 11. In FIG. 4, only one VM 11 is illustrated. However, more than one VM may be started.

When the VMM 10 receives a request from the management OS 12, the resources of the server 1 are allocated to or deallocated from the VM 11. The VM 11 to which the resources are allocated is ready to access the resources.

The management OS 12 starts or terminates the VM 11 and requests the VMM 10 to allocate the resourses of the server 1. The management OS 12 has a VM moving part 121, a movement-completion detecting part 122, and so on. The VM moving part 121 moves the VM 11 to the terminal 2 when a specific application is ran on the VM 11. For example, the VM moving part 121 sends the execution status of the CPU 30, etc. used by the VM 11 to the terminal 2. The movement-completion detecting part 122 detects when the movement of the VM 11 by the VM moving part 121 is completed.

In this embodiment, the VM moving part 121 moves the VM 11 using live migration. In live migration, the VM 11 is moved in two operations: a first moving process and a second moving process. In the first moving process, the VM moving part 121 copies the content of the memory (RAM 32, etc.) used by the VM 11 running on the server 1 to the terminal 2 to which the VM 11 is to be moved. Since the content of the memory changes even during copying, the changed content of the memory is copied again to the terminal 2. The VM moving part 121 repeatedly copies the content of the memory to the terminal 2 until the content of the memory becomes lower than a threshold.

When the second moving process is started after the first moving process is completed, the VM moving part 121 pauses the VM 11 and copies the remaining content of the memory from the server 1 to the terminal 2. Furthermore, the VM moving part 121 copies the execution status of the CPU 30, etc. used by the VM 11 to the terminal 2. In this way, the VM 11 (moved VM 23) starts running on the terminal 2 in accordance with the copied content.

The VM 11 is linked to the terminal VM 21 running on the terminal 2, which is connected to the server 1, and is remotely controlled by the linked terminal VM 21. An RDP server 112, a virtual drive 113, and so on run on the VM 11 by executing programs in the OS running on the VM 11. The RDP server 112 is connected to the terminal VM 21 (for example, an RDP client described below), which is allocated to the VM 11, via the network. The virtual drive 113 is, for example, a virtual drive for the DVD 3 that allows access to data recorded on the DVD 3 inserted to the disc device 44b of the terminal 2.

The VM 11 has an agent 110 that carries out processing in the VM 11. The agent 110 has an application start-up part 130, an application exit part 131, an application-status acquiring part 132, a status storing part 133, an application monitoring part 134, a monitored-application-status storing part 135, an application-status restoring part 136, and a device allocating part 137.

The application start-up part 130 starts an application 111, such as an image application, on the VM 11 in response to a request from the terminal 2. The application exit part 131 exits the application 111 running on the VM 11 in response to a request from the management OS 12 or the terminal 2.

The application-status acquiring part 132 acquires the status of the application 111 being executed (hereinafter referred to as "application status") and records it in the status storing part 133. The application status includes, for example, the resources being used by the application 111, the operating status of the application 111, the displayed content, and the display position of an image related to the application 111 on the monitor. The application-status restoring part 136 restores the application 111 ended by the application exit part 131 to a state before being ended in accordance with the content stored in the status storing part 133.

The application monitoring part 134 (determining part) monitors the execution of the application 111 on the basis of information stored in the monitored-application-status storing part 135. Information (e.g., executable file name, etc.) of the application to be monitored by the application monitoring part 134 (hereinafter referred to as "target application") is stored in the monitored-application-status storing part 135. In this embodiment, the target application is an image application. That is, the application monitoring part 134 monitors whether an image application is running on the VM 11. When the application monitoring part 134 determines that an image application is running, it notifies the VM moving part 121 of the management OS 12.

The device allocating part 137 allocates or deallocates the virtual drive 113 to or from the RDP server 112. Since the virtual drive 113 enables access to the DVD 3 inserted to the disc device 44b, the RDP server 112 may virtually access the disc device 44b of the terminal 2 by accessing the virtual drive 113.

Figure 5:
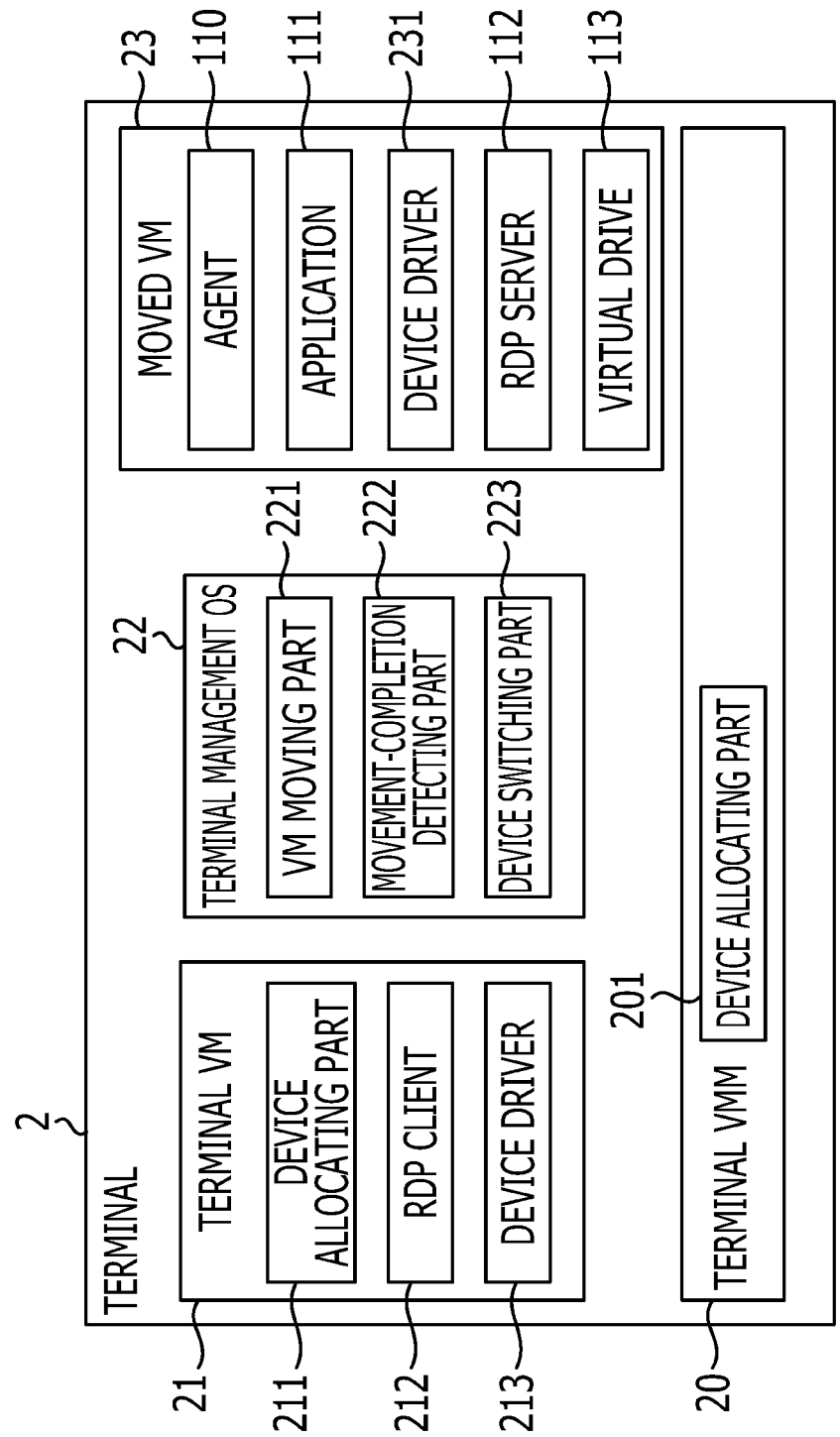
FIG. 5 is a block diagram illustrating the functions of a terminal.

FIG. 5 is a block diagram illustrating the functions of the terminal 2. The VM 11 is moved from the server 1 to the terminal 2, and the moved VM 23 runs on the terminal VMM 20. FIG. 5 illustrates the terminal 2 in a state in which the VM 11 is moved from the server 1 and the moved VM 23 is running on the terminal VMM 20.

By executing programs by the CPU 40, the terminal VMM 20 runs on the terminal 2, and the terminal VM 21 and a terminal management OS 22 runs on the terminal VMM 20. The terminal management OS 22 allocates the resources of the terminal 2, such as the CPU 40 and the ROM 41, to the terminal VM 21. After the resources are allocated, the guest OS starts running on the terminal VM 21. When the VM 11 is moved from the server 1, the moved VM 23 runs on the terminal VMM 20.

When the terminal VMM 20 receives a request from the terminal management OS 22, it allocated or deallocated the resources of the server 1 to or from the terminal VM 21. The terminal VM 21 to which the resources are allocated is ready to access the resources. The terminal VMM 20 has a device allocating part 201. The device allocating part 201 allocates the physical devices, such as the input/output device 44a and the disc device 44b, to the terminal VM 21 in response to a request from the terminal management OS 22 to allow the terminal VM 21 to access the physical devices. When the moved VM 23 runs on the terminal VMM 20, the terminal VM 21 switches the allocation of the physical devices of the terminal 2 to the moved VM 23 in response to a request from the terminal management OS 22 to allow the moved VM 23 to access the physical devices.

The terminal management OS 22 has a VM moving part 221, a movement-completion detecting part 222, and a device switching part 223. The VM moving part 221 moves the moved VM 23 running on the terminal VMM 20 to the server 1 on the basis of given conditions. The movement-completion detecting part 222 detects when the movement of the moved VM 23 by the VM moving part 221 is completed.

The device switching part 223 requests allocation or deallocation of the physical devices of the terminal 2 to a device allocating part 211 of the terminal VM 21, described below, or the device allocating part 137 of the VM 11. As described above, the device switching part 223 requests the switching of the allocation destination to the device allocating part 201 of the terminal VMM 20.

The terminal VM 21 is linked to the VM 11 running on the server 1 and is remotely connected to the linked VM 11 so that it can remotely control the VM 11. The terminal VM 21 has the device allocating part 211, an RDP client 212, and a device driver 213. The RDP client 212 is connected to the RDP server 112 of the VM 11 running on the server 1 via the network so that it can operate the VM 11 of the server 1. The device driver 213 controls the physical devices of the terminal 2 allocated by the device allocating part 201.

The device allocating part 211 allocates or deallocates the physical devices of the terminal 2 to or from the RDP client 212 in response to a request from the device switching part 223 of the terminal management OS 22. By allocating the physical devices of the terminal 2 to the RDP client 212, the VM 11 of the server 1 can access the physical devices of the terminal 2 via the RDP.

The moved VM 23 has an agent 110, an RDP server 112, and a virtual drive 113, which are substantially the same as those of the VM 11. The application 111 executed by the agent 110 (for example, the application-status restoring part 136) on the VM 11 is restore on the moved VM 23. The moved VM 23 has a device driver 231 that enables connection to the physical devices of the terminal 2. In the moved VM 23, the device allocating part 137 deallocates the physical devices of the terminal 2 from the RDP server 112 in response to a request from the device switching part 223 of the terminal management OS 22. Then, when the device allocating part 201 of the terminal VMM 20 reallocates the physical devices of the terminal 2, which are allocated to the terminal VM 21, to the moved VM 23, the physical devices are controlled by the device driver 231. In this way, the moved VM 23 can directly control the physical devices of the terminal 2. The device driver 231 in the moved VM 23 may also be provided for the VM 11 running on the server 1.

Next, the processes carried out by the computer system including the above-described server 1 and terminal 2 will be described below.

Figure 6:
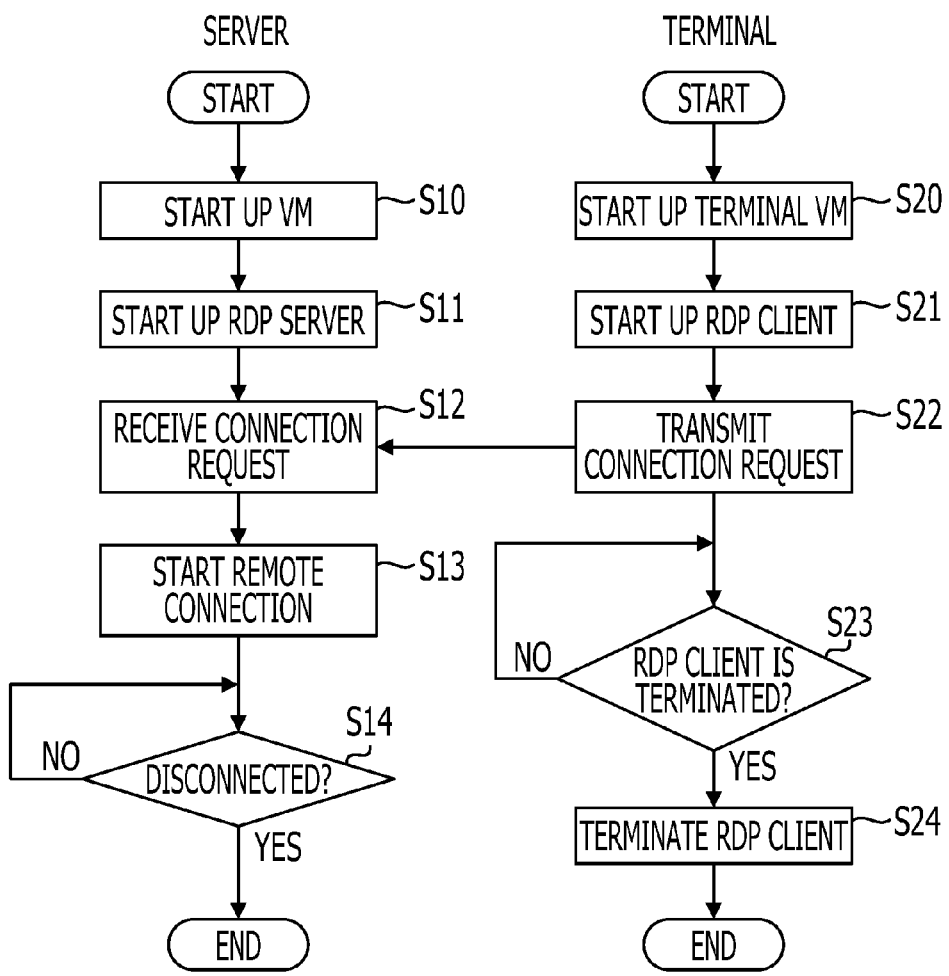
FIG. 6 is a flow chart illustrating the processes of VM connection and disconnection.

FIG. 6 is a flow chart illustrating the processes of VM connection and disconnection. In FIG. 6, the processes carried out by the server 1 and the terminal 2 are illustrated in parallel.

The VMM 10 is executed by the server 1, and the management OS 12 starts running on the VMM 10. The management OS 12 starts the VM 11 (S10). The started-up VM 11 starts up the RDP server 112 (S11). In the terminal 2, the terminal VMM 20 is executed, and the terminal management OS 22 starts running on the terminal VMM 20. The terminal management OS 22 starts the terminal VM 21 (S20). The terminal VM 21 starts the RDP client 212 (S21). The terminal VM 21 starts the RDP client 212 by, for example, receiving a remote connection request from a user. Then, the terminal VM 21 sends the remote connection request to the VM 11 (S22).

The VM 11 of the server 1 receives the remote connection request from the terminal VM 21 (S12) and establishes remote connection (S13). The terminal VM 21 of the terminal 2 may be connected to the VM 11 of the server 1 when remote operation is started or may be connected to the VM 11 in accordance with, for example, the result of user authentication. The establishment of a connection between the VM 11 of the server 1 and the terminal VM 21 of the terminal 2 enables transmission and reception of operation information, display information, and so on.

The terminal 2 determines whether the terminal VM 21 accepted the termination of the RDP client 212 (S23). When the terminal VM 21 has not accepted the termination (NO in S23), the terminal VM 21 repeats Operation S23. When the terminal VM 21 has accepted the termination (YES in S23), the terminal VM 21 terminates the RDP client 212 (S24).

The server 1 determines whether the remote connection of the VM 11 has been terminated (S14). For example, the VM 11 determines whether the remote connection has been terminated by occasionally confirming the remote connection status. When the remote connection is not terminated (NO in S14), the VM 11 repeats Operation S14. When the remote connection is terminated (YES in S14), the VM 11 ends the process. Instead, the RDP server 112 may be terminated when the remote connection is terminated.

Figure 7:
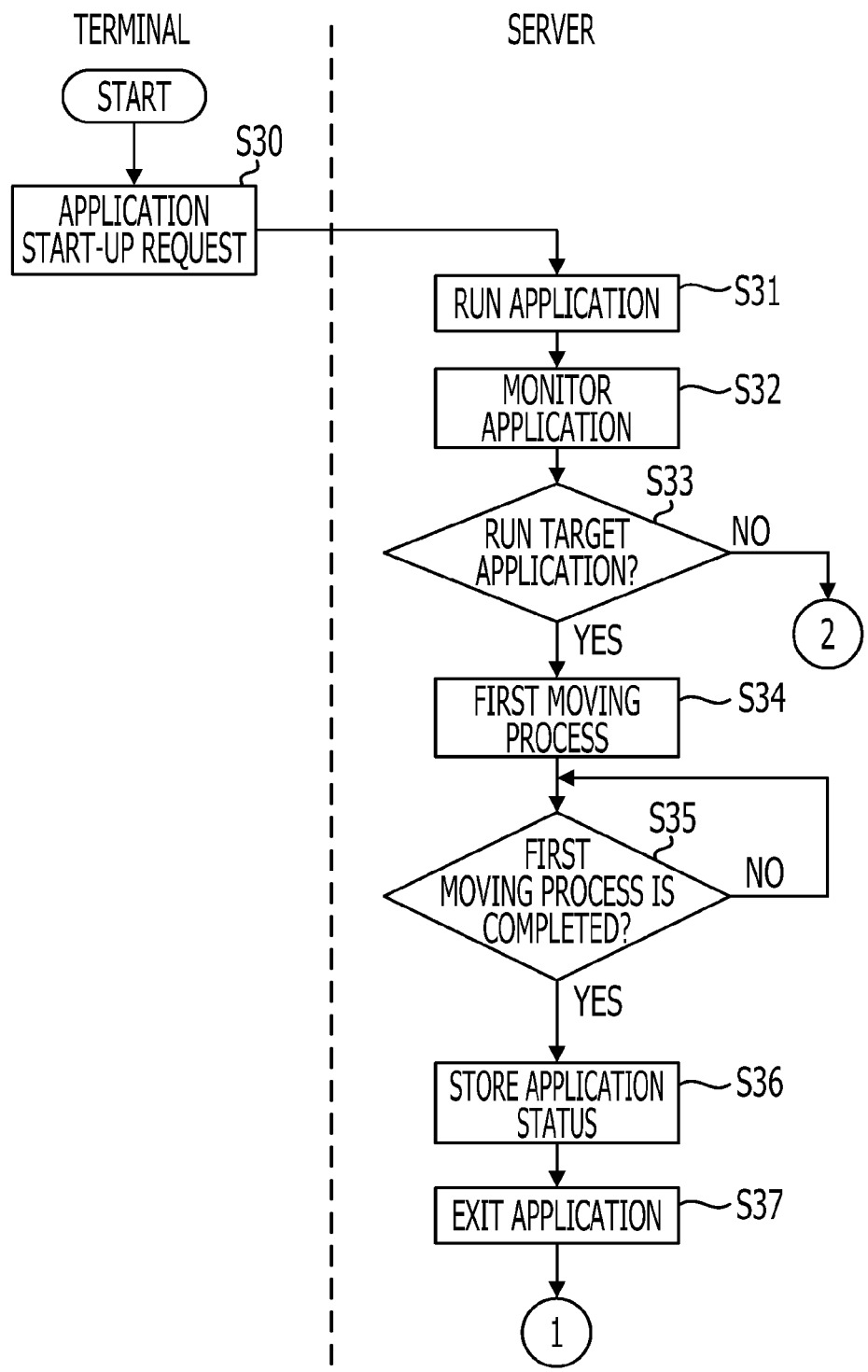
FIG. 7 is a flow chart illustrating the processes of moving the VM from the server to the terminal.
Figure 8:
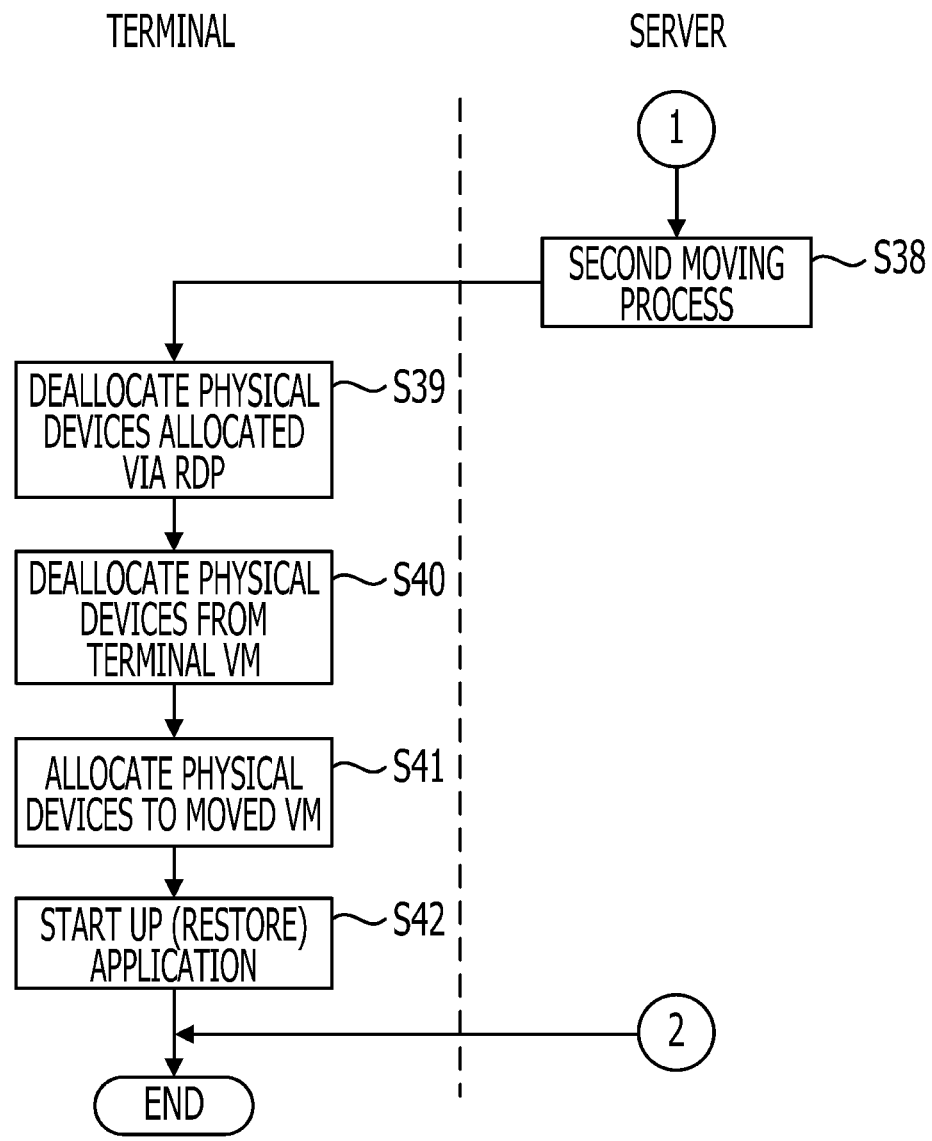
FIG. 8 is a flow chart illustrating the processes of moving the VM from the server to the terminal.

FIGS. 7 and 8 are flow charts illustrating the processes of moving the VM from the server 1 to the terminal 2. In FIGS. 7 and 8, the left side of the dashed line represents a process carried out by the terminal 2, and the right side represents a process carried out by the server 1.

In the terminal 2, the terminal VM 21 requests the start-up of an application to the VM 11 of the server 1 (S30). After receiving the request, the application start-up part 130 in the VM 11 starts running the corresponding application 111 (S31). For example, the terminal VM 21 notifies the VM 11 of the server 1 that the DVD 3 is inserted to the disc device 44b of the terminal 2. In the notified VM 11, the application start-up part 130 starts the image application. The virtual drive 113 of the VM 11 receives the data of the DVD 3 read out on the terminal 2. In the VM 11, the image application accesses the virtual drive 113 to reproduce an image. Then, the VM 11 sends the processing result of the image application to the terminal VM 21 of the terminal 2 to display the processing result on the monitor of the terminal 2 (see FIG. 2A). Instead, the terminal VM 21 may request the VM 11 to start the application when a user instructs image reproduction.

In the terminal 2, the application monitoring part 134 of the VM 11 periodically monitors the application being executed (S32) and determines whether the application 111 being executed is the target application on the basis of the content stored in the monitored-application-status storing part 135 (S33). In this embodiment, the target application is the image application. When the target application is not executed (NO in S33), the process ends. When the target application is executed (YES in S33), i.e., when the image application is executed, the application monitoring part 134 notifies the VM moving part 121 of the management OS 12 that the target application is executed, and the VM moving part 121 starts the first moving process (S34).

The movement-completion detecting part 122 determines whether the first moving process by the VM moving part 121 has been completed (S35). At this time, the movement-completion detecting part 122 determines whether the capacity of the memory (RAM 32, etc.) using by the VM 11 is smaller than a threshold. When it is determined that the first moving process is not completed (NO in S35), the movement-completion detecting part 122 repeats Operation S35. When it is determined that the first moving process is completed (YES in S35), the application-status acquiring part 132 of the VM 11 acquires the application status and stores it in the status storing part 133 (S36). The application-status acquiring part 132 starts acquiring the application status when the movement-completion detecting part 122 notifies that the first moving process is completed. Next, the application exit part 131 of the VM 11 exits the application 111 being executed (S37) (see FIG. 2B).

Then, the VM moving part 121 carries out the second moving process (S38). In the second moving process, the VM moving part 121 pauses the VM 11 and copies the remaining memory content to the terminal 2. Furthermore, the VM moving part 121 copies the execution status of the CPU 30, etc. used by the VM 11 to the terminal 2.

After moving the VM 11 in the second moving process, in the terminal 2, the device allocating part 211 of the terminal VM 21 and the device allocating part 137 of the moved VM 23 deallocate the physical devices allocated via the RDP in response to a request from the device switching part 223 of the terminal management OS 22 (S39). Next, in response to the request from the device switching part 223, the device allocating part 201 of the terminal VMM 20 deallocates the physical devices of the terminal 2 allocated to the terminal VM 21 (S40) and allocates the deallocated physical devices to the moved VM 23 (S41). In this way, the device driver 231 of the moved VM 23 is connected to the physical devices, and the moved VM 23 can directly control the physical devices of the terminal 2. Then, the application-status restoring part 136 of the moved VM 23 starts the application 111 in accordance with the application status stored in the status storing part 133 (S42). In this way, the application 111 is restored to the status corresponding to when it was running on the VM 11 before being exited (see FIG. 2C), and an image can be continuously reproduced before and after moving the VM. Then, the process ends.

Figure 9:
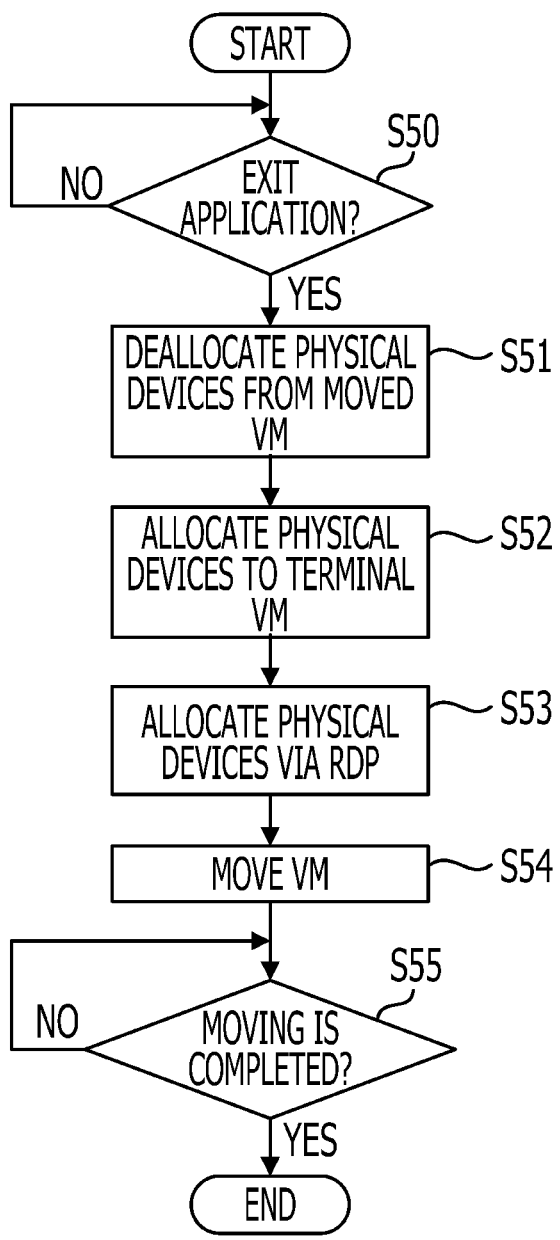
FIG. 9 is a flow chart illustrating the process of moving a VM from the terminal to the server.

FIG. 9 is a flow chart illustrating the process of moving a VM from the terminal 2 to the server 1.

In the terminal 2, the agent 110 of the moved VM 23 determines whether the application 111 running the moved VM 23 has been exited (S50). The exit timing of the application 111 may be when a user instructs the exit or, if the application 111 is an image application, when image reproduction is terminated.

When the application 111 is not exited (NO in S50), Operation S50 is repeated. When the application 111 is exited (YES in S50), the device allocating part 201 of the terminal VMM 20 deallocates the physical devices of the terminal 2 allocated to the moved VM 23 in response to a request from the device switching part 223 of the terminal management OS 22 (S51) and allocates the deallocated physical devices to the terminal VM 21 (S52).

Next, the device allocating part 211 of the terminal VM 21 and the device allocating part 137 of the moved VM 23 allocate the physical devices of the terminal 2 via the RDP in response to a request from the device switching part 223 of the terminal management OS 22 (S53). Then, the VM moving part 221 of the terminal management OS 22 starts moving the moved VM 23 to the server 1 (S54). The movement-completion detecting part 122 determines whether the moving process by the VM moving part 221 is completed (S55). When it is determined that the moving process is not completed (NO in S55), the movement-completion detecting part 122 repeats Operation S55. When it is determined that the moving process is completed (YES in S55), the process ends. In this way, the VM moved from the server 1 to the terminal 2 is returned to the original server 1.

In the computer system according to this embodiment, when an image is reproduced by the VM 11 using the physical devices of the terminal 2, by moving the VM 11 to the terminal 2, the moved VM 23 (VM 11) can access the physical devices without using the network. In this way, since the image is reproduced without using the network, a high quality image is displayed on the monitor. Furthermore, since the image is reproduced before completing the process of moving the VM 11 from the server 1 to the terminal 2, the amount of time required to reproduce the image is reduced. Since the VM 11 is automatically moved and the VM 11 is started (restored) when an image application is executed, the user can view a high quality image without carrying out any specific operation.

In this embodiment, an image recorded on the DVD 3 is reproduced by inserting the DVD 3 to the disc device 44b. However, this is not limited thereto. The above-described computer system may be used for reproducing, for example, video, image, and other contents recorded on an HDD or a flash memory detachable from a USB.

In this embodiment, the VMM runs on hardware, and the VMM used is a hypervisor VMM that runs various programs, such as a VM and a management OS. However, the VMM is not limited thereto. For example, an OS may run on hardware, and a VM may run on the OS.

In this embodiment, when the VM 11 is moved from the server 1 to the terminal 2, the user is requested permission to move the VM 11.

Figure 10:
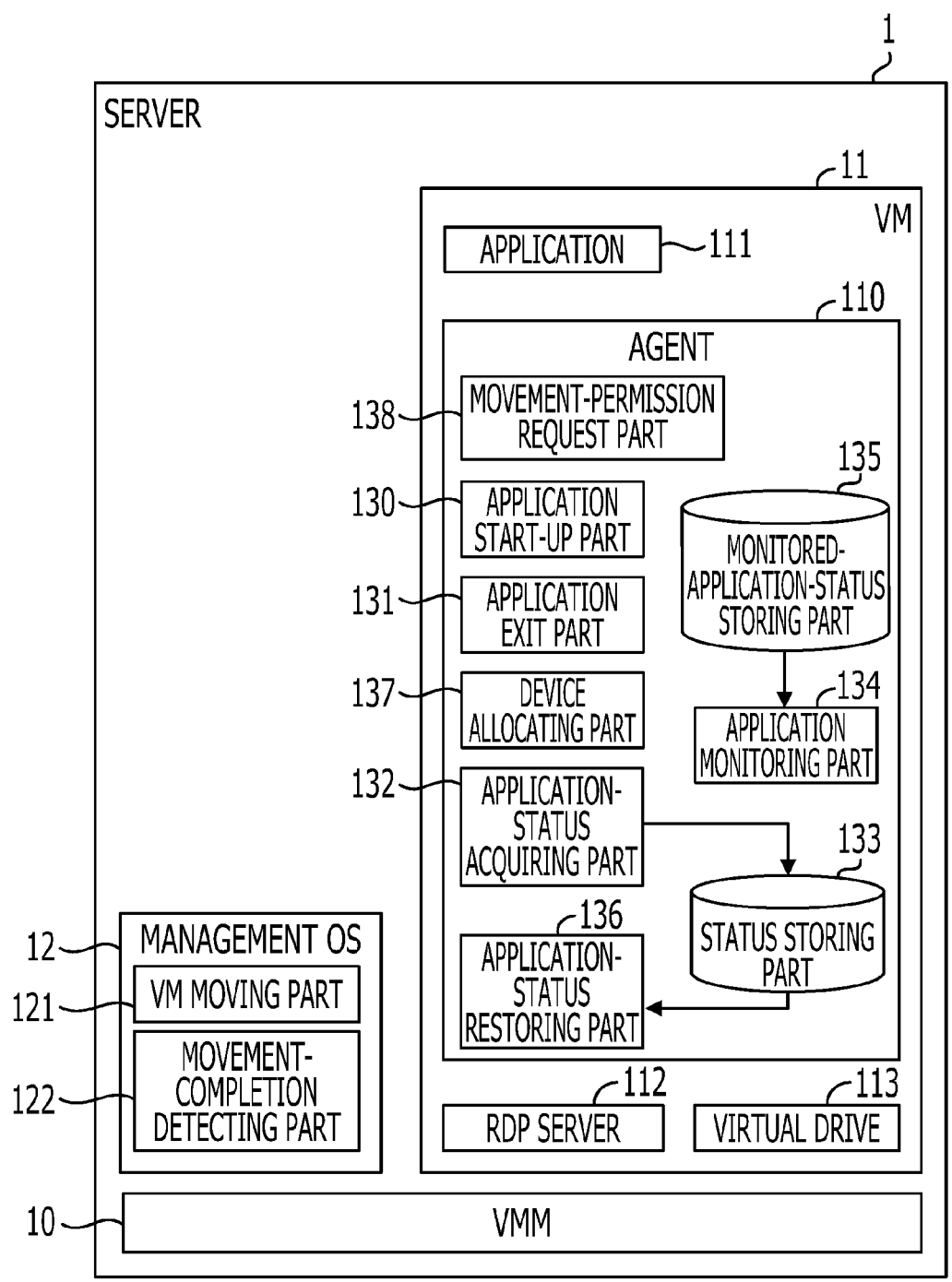
FIG. 10 is a block diagram illustrating the functions of the server.
Figure 11:
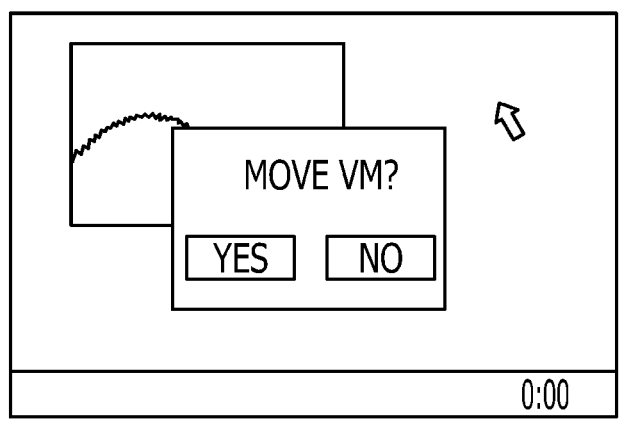
FIG. 11 is a schematic view of a confirmation screen for confirming the moving of a VM.

FIG. 10 is a block diagram illustrating the functions of the server 1. The agent 110 according to this embodiment has a movement-permission request part 138, in addition to the functions according to the above-described embodiment. The terminal management OS 22 of the management OS 12 notifies the movement-permission request part 138 that the first moving process is completed. After being notified, the movement-permission request part 138 displays, on the monitor of the terminal 2, a confirmation screen for confirming whether the second moving process is to be carried out. FIG. 11 is a schematic view of the confirmation screen for confirming the moving of the VM 11. The confirmation screen is displayed on the monitor of the terminal 2 after the first moving process is completed to allow the user to select an icon for moving or not moving the VM 11.

The VM moving part 121 of the management OS 12 receives the user's instruction through the confirmation screen displayed on the monitor of the terminal 2 and, in accordance with the instruction, the second moving process.

Figure 12:
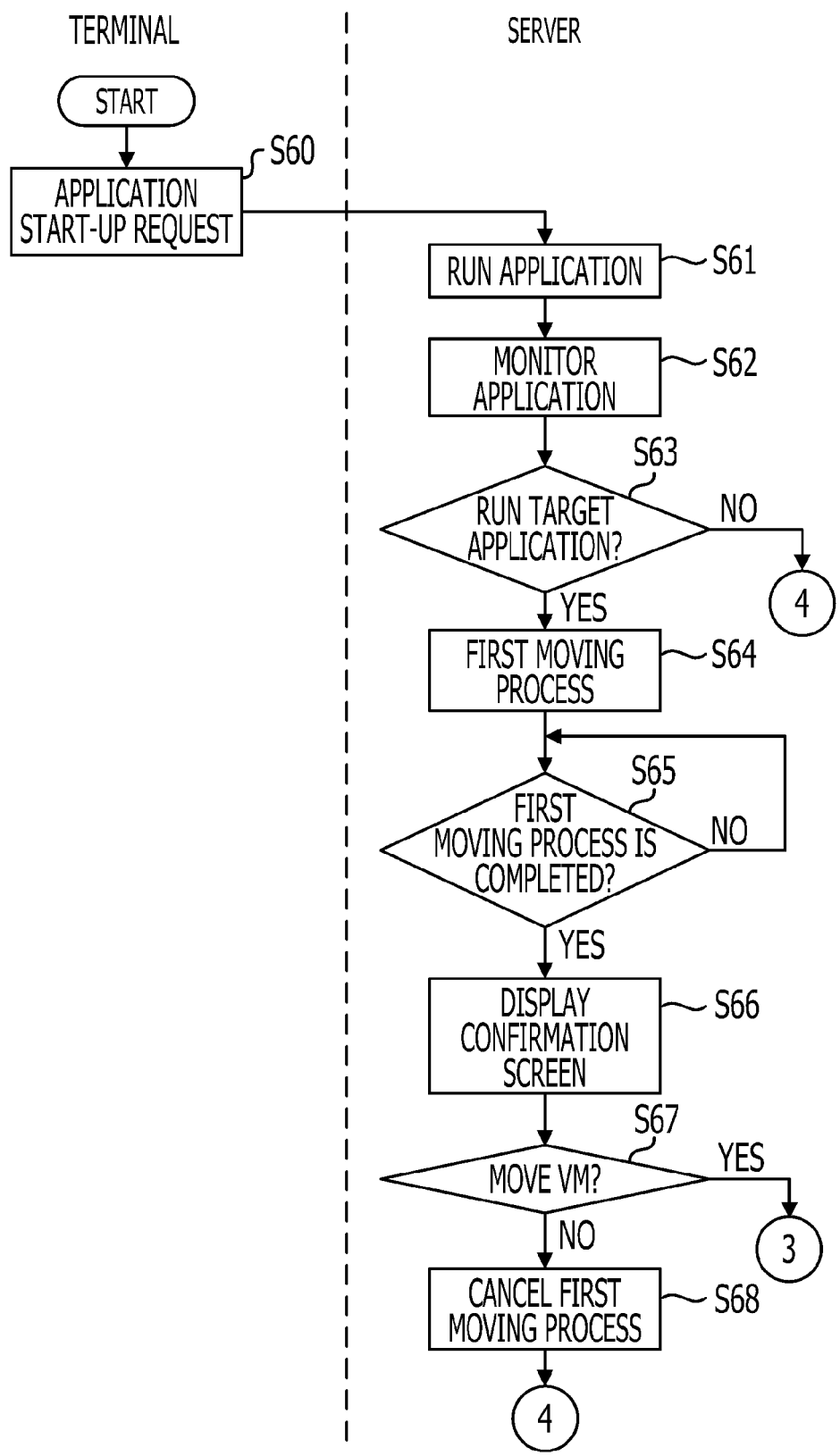
FIG. 12 is a flow chart illustrating the process of moving a VM from the server to the terminal.
Figure 13:
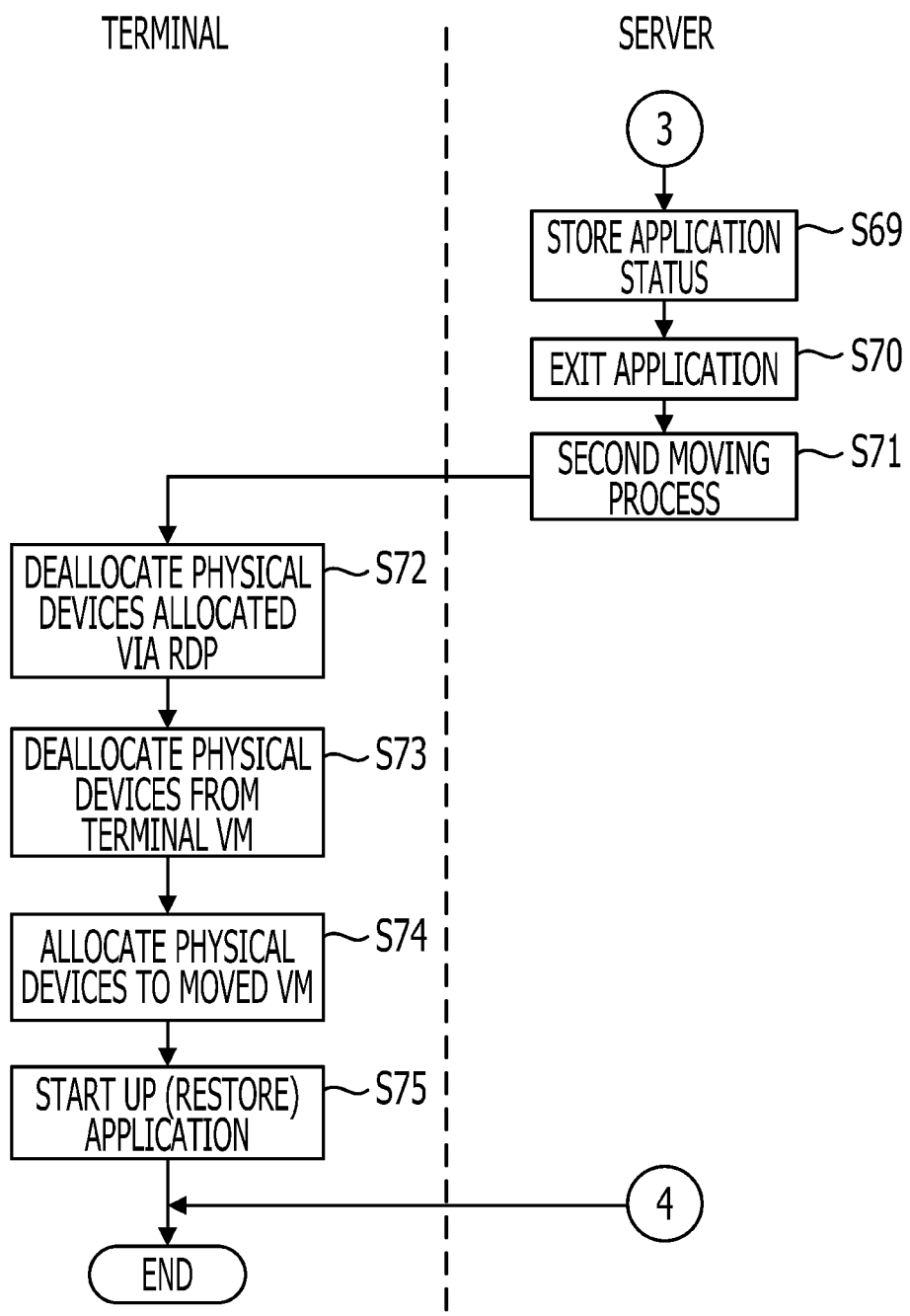
FIG. 13 is a flow chart illustrating the process of moving a VM from the server to the terminal.

FIGS. 12 and 13 are flow charts illustrating the process of moving a VM from the server 1 to the terminal 2.

In the terminal 2, the terminal VM 21 requests the start-up of an application to the VM 11 of the server 1 (S60). After the VM 11 receives the request, the application start-up part 130 executes the corresponding application 111 (S61). In the terminal 2, the application monitoring part 134 of the VM 11 monitors the application 111 being executed (S62) and determines whether the application 111 is the target application on the basis of the content stored in the monitored-application-status storing part 135 (S63). When the target application is not executed (NO in S63), the process ends. When the target application is executed (YES in S63), the application monitoring part 134 notifies the VM moving part 121 of the management OS 12 that the target application is executed, and the VM moving part 121 starts the first moving process (S64).

The movement-completion detecting part 122 determines whether the first moving process carried out by the VM moving part 121 is completed (S65). When it is determined that the first moving process is not completed (NO in S65), the movement-completion detecting part 122 repeats Operation S65. When it is determined that the first moving process is completed (YES in S65), the confirmation screen illustrated in FIG. 11 is displayed on the monitor of the terminal 2 (S66). The movement-permission request part 138 receives the user's instruction through the displayed confirmation screen and, in accordance with the instruction, determines whether to move the VM 11 (S67). When the VM 11 is not moved (NO in S67), the VM moving part 121 cancels the first moving process (S68). Then, then the process ends.

When the VM 11 is moved (YES in S67), the application-status acquiring part 132 of the VM 11 acquires the application status and stores it in the status storing part 133 (S69). Next, the application exit part 131 of the VM 11 exits the application 111 being executed (S70). Then, the VM moving part 121 performs the second moving process (S71). After the VM 11 is moved, in the second moving process, the device allocating part 211 of the terminal VM 21 and the device allocating part 137 of the moved VM 23 in the terminal 2 deallocate the physical devices allocated via the RDP in response to a request from the device switching part 223 of the terminal management OS 22 (S72).

Next, the device allocating part 201 of the terminal VMM 20 deallocates the physical devices of the terminal 2, which are allocated to the terminal VM 21, in response to a request from the device switching part 223 (S73) and allocates the deallocated physical devices to the moved VM 23 (S74). Then, the application-status restoring part 136 of the moved VM 23 starts the application 111 on the basis of the application status stored in the status storing part 133 (S75), and then the process ends.

The moved VM 23 may be moved from the terminal 2 to the server 1 in substantially the same manner as in the above-described embodiment.

In the computer system according to this embodiment, when an image is reproduced by the VM 11 using the physical devices of the terminal 2, by moving the VM 11 to the terminal 2, the moved VM 23 (VM 11) can access the physical devices without using the network. In this way, since the image is reproduced without using the network, a high quality image is displayed on the monitor. Furthermore, since the image is reproduced before completing the process of moving the VM 11 from the server 1 to the terminal 2, the amount of time required to reproduce the image is reduced. When the user does not want to move the VM, the movement of the VM may be canceled by confirming the user about moving the VM.

In this embodiment, the confirmation screen is displayed after the first moving process is completed. Instead, however, the confirmation screen may be displayed before starting the first moving process. For example, the confirmation screen illustrated in FIG. 11 may be displayed immediately after an image is reproduced and displayed on the monitor of the terminal 2, as illustrated in FIG. 2A.

In this embodiment, it is determined whether the application 111 is the target application on the basis of file data processed by the application 111 running on the VM 11.

Figure 14:
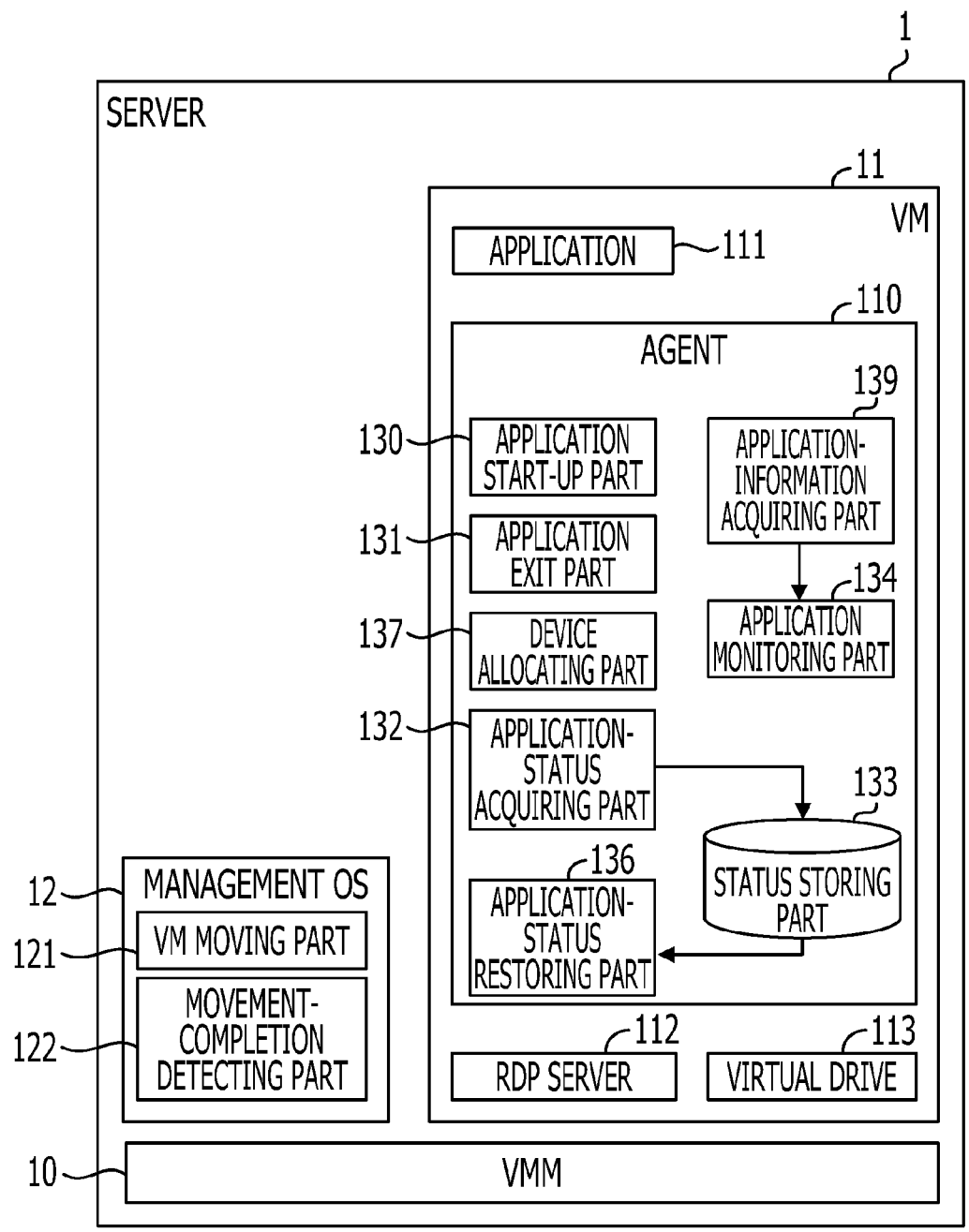
FIG. 14 is a block diagram illustrating the functions of the server.

FIG. 14 is a block diagram illustrating the functions of the server 1.

The agent 110 according to this embodiment does not include the monitored-application-status storing part 135 but includes an application-information acquiring part 139. The application-information acquiring part 139 acquires, for example, process information of the application 111 executed by the guest OS running on the VM 11. Process information includes, for example, the process name of the application 111 being executed, the name of the file being used by the application 111, and the file size. When the file used by the application 111 is an image file, the process information includes reproduction time. The application monitoring part 134 determines whether the application 111 is the target application on the basis of the application information acquired by the application-information acquiring part 139.

Figure 15:
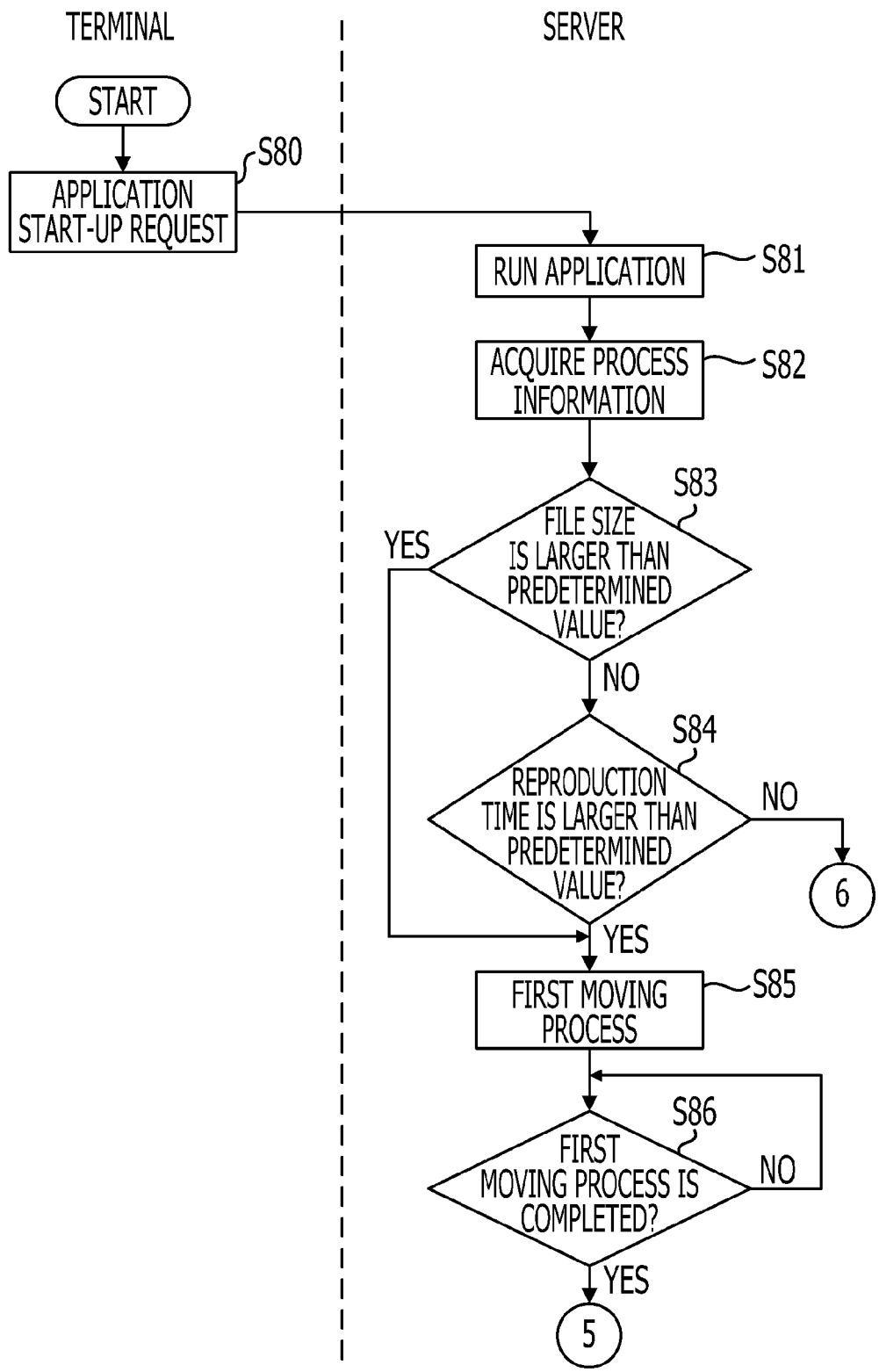
FIG. 15 is a flow chart illustrating the process of moving a VM from the server to the terminal.
Figure 16:
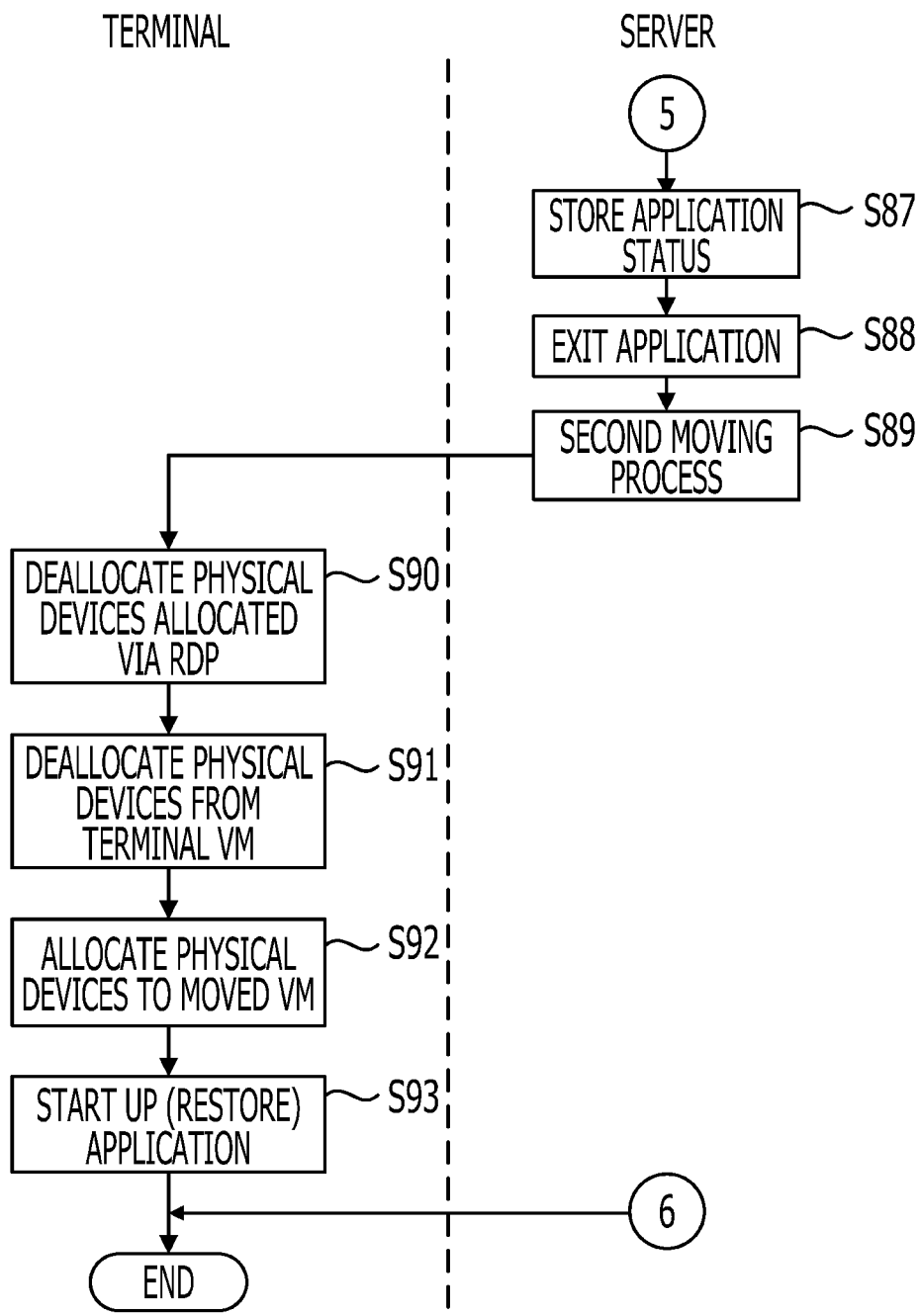
FIG. 16 is a flow chart illustrating the process of moving a VM from the server to the terminal.

FIGS. 15 and 16 are flow charts illustrating the process of moving the VM from the server 1 to the terminal 2.

In the terminal 2, the terminal VM 21 requests the VM 11 of the server 1 to start the application (S80). After the VM 11 receives the request, the application start-up part 130 executes the corresponding application 111 (S81). In the terminal 2, the application-information acquiring part 139 acquires process information (S82). The application monitoring part 134 of the VM 11 determines whether the file size is larger than a lower limit (for example, 1 MB) on the basis of the process information acquired by the application-information acquiring part 139 (S83). When the file size is not larger than the lower limit (NO in S83), the application monitoring part 134 determines whether the duration of the reproduction time is larger than a lower limit (for example, 1 minute) (S84). When the duration of the reproduction time is not larger than the lower limit (NO in S84), the process ends.

When the duration of the reproduction time is larger than the lower limit (YES in S84) or when the file size is larger than the lower limit (YES in S83), the application monitoring part 134 notifies the VM moving part 121 of the management OS 12 that the target application is executed, and the VM moving part 121 starts the first moving process (S85). The movement-completion detecting part 122 determines whether the first moving process performed by the VM moving part 121 is completed (S86). When it is determined that the first moving process is not completed (NO in S86), the movement-completion detecting part 122 repeats Operation S86. When it is determined that the first moving process is completed (YES in S86), the application-status acquiring part 132 acquires the application status and stores it in the status storing part 133 (S87). Next, the application exit part 131 of the VM 11 exits the application 111 being executed (S88). Then, the VM moving part 121 performs the second moving process (S89). After the VM 11 is moved in the second moving process, in the terminal 2, the device allocating part 211 of the terminal VM 21 and the device allocating part 137 of the moved VM 23 deallocate the physical devices allocated via the RDP in response to a request from the device switching part 223 of the terminal management OS 22 (S90).

Next, the device allocating part 201 of the terminal VMM 20 deallocates the physical devices of the terminal 2 allocated to the terminal VM 21 (S91) and allocates the deallocated physical devices to the moved VM 23 (S92). Then, the application-status restoring part 136 of the moved VM 23 starts the application 111 on the basis of the application status stored in the status storing part 133 (S93), and the process ends.

The moved VM 23 may be moved from the terminal 2 to the server 1 in substantially the same way as in the above-described embodiment.

As described above, in the computer system according to this embodiment, when an image is reproduced by the VM 11 using the physical devices of the terminal 2, by moving the VM 11 to the terminal 2, the moved VM 23 (VM 11) can access the physical devices without using the network. In this way, since the image is reproduced without using the network, a high quality image is displayed on the monitor. Furthermore, since the image is reproduced before completing the process of moving the VM 11 from the server 1 to the terminal 2, the amount of time required to reproduce the image is reduced. Since the target application is determined on the basis of the file data processed by the application 111, the target application does not have to be selected in advance.

The components and operations according to the embodiments are not limited to those in the above-described embodiments and may be modified appropriately.

The programs according to the embodiments are recorded on a computer-readable storage medium and distributed. The computer-readable storage medium is, for example, a non-volatile storage medium, such as a flexible disc, a hard disc, a compact disc read only memory (CD-ROM), a magneto-optical disc (MO), a DVD, a DVD-ROM, a DVD random access memory (DVD-RAM), a Blu-ray disc (BD), a USB memory, or a semiconductor memory. The computer programs may be transmitted via an electric communication line, a wireless or wire communication line, or a network, such as the Internet. The computer-readable storage medium does not include carrier waves including a computer program. For a computer program embedded in carrier waves, a readable storage medium including the program is provided to the computer that originally transmitted the carrier wave. Therefore, a computer-readable storage medium is a physically tangible storage medium.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has(have) been described in detail, it should be understood that the various changes, substitutions, and alterations could be made hereto without departing from the spirit and scope of the invention.

What is claimed is:

1. A computer system comprising:
a server including a first processor, a first memory, a first virtual machine, wherein the first virtual machine includes a virtual drive;
a terminal including a second processor, a second memory, a second virtual machine, and a physical device allocated to the second virtual machine, wherein the physical device is remotely accessible by the first virtual machine using the virtual drive over a network; and
the server is configured to:
execute an application on the first virtual machine based on a request from the second virtual machine in the terminal;
receive data from the physical device of the terminal through the virtual drive;
process the data using the application and transmit the processed data back to the second virtual machine;
periodically monitor the application being executed on the first virtual machine and store application status on the first virtual machine;
detect whether the application being executed is a target application that incurs high network traffic based on the application status;
upon detecting that the application is the target application,
copy content of the first memory used by the first virtual machine to the terminal until remaining content of the first memory becomes lower than a threshold;
exit the application being executed on the first virtual machine and pause execution of the first virtual machine in the server;
copy the remaining content of the first memory and execution status of the first processor used by the first virtual machine to the terminal;
migrate the first virtual machine from the server to the terminal as a moved first virtual machine,
wherein the terminal is configured to:
deallocate the physical device from the second virtual machine and allocate the physical device to the moved first virtual machine;
start the application on the moved first virtual machine in accordance with the application status stored on the moved first virtual machine; and
continue execution of the application on the moved first virtual machine by accessing the physical device of the terminal through the moved first virtual machine.

2. A method comprising:
executing an application on a first virtual machine located on a server based on a request from a second virtual machine in a terminal,
receiving, by the server, data from a physical device of the terminal through a virtual drive mapped to the physical device,
processing, by the server, the data using the application and transmit the processed data back to the second virtual machine,
periodically monitoring, at the server, the application being executed on the first virtual machine and store application status on the first virtual machine,
detecting whether the application being executed at the server is a target application that incurs high network traffic based on the application status,
upon detecting that the application is the target application,
copying content of a memory used by the first virtual machine to the terminal until remaining content of the memory becomes lower than a threshold,
exiting the application being executed on the first virtual machine and pause execution of the first virtual machine in the server,
copying the remaining content of the memory and execution status of a processor used by the first virtual machine to the terminal,
migrating the first virtual machine from the server to the terminal as a moved first virtual machine,
deallocating, at the terminal, the physical device from the second virtual machine and allocate the physical device to the moved first virtual machine;
starting, at the terminal, the application on the moved first virtual machine in accordance with the application status stored on the moved first virtual machine; and
continuing execution of the application on the moved first virtual machine by accessing the physical device of the terminal through the moved first virtual machine.

3. A server comprising:
a memory;
a first virtual machine; and
a processor configured to
execute an application on the first virtual machine based on a request from a second virtual machine in a terminal,
receive data from a physical device of the terminal through a virtual drive mapped to the physical device,
process the data using the application and transmit the processed data back to the second virtual machine,
periodically monitor the application being executed on the first virtual machine and store application status on the first virtual machine,
detect whether the application being executed is a target application that incurs high network traffic based on the application status, upon detecting that the application is the target application,
    copy content of the memory used by the first virtual machine to the terminal until remaining content of the memory becomes lower than a threshold,
    exit the application being executed on the first virtual machine and pause execution of the first virtual machine in the server,
    copy the remaining content of the memory and execution status of the processor used by the first virtual machine to the terminal, and
    migrate the first virtual machine from the server to the terminal as a moved first virtual machine to which the physical device of the terminal will be allocated to instead of the second virtual machine, wherein the execution of the application is continued on the moved first virtual machine in accordance with the application status stored on the moved first virtual machine and by accessing the physical device through the moved first virtual machine.

4. A method comprising:

executing an application on a first virtual machine located on a server based on a request from a second virtual machine in a terminal, receiving, by the server, data from a physical device of the terminal through a virtual drive mapped to the physical device, processing, by the server, the data using the application and transmit the processed data back to the second virtual machine, periodically monitoring, at the server, the application being executed on the first virtual machine and store application status on the first virtual machine, detecting whether the application being executed at the server is a target application that incurs high network traffic based on the application status, upon detecting that the application is the target application,
    copying content of a memory used by the first virtual machine to the terminal until remaining content of the memory becomes lower than a threshold,
    exiting the application being executed on the first virtual machine and pause execution of the first virtual machine in the server,
    copying the remaining content of the memory and execution status of a processor used by the first virtual machine to the terminal, and
    migrating the first virtual machine from the server to the terminal as a moved first virtual machine to which the physical device of the terminal will be allocated to instead of the second virtual machine, wherein the execution of the application is continued on the moved first virtual machine in accordance with the application status stored on the moved first virtual machine and by accessing the physical device through the moved first virtual machine.

\* \* \* \* \*